May 11, 1971  C. M. DOLAN ET AL  3,578,520
THERMAL INSULATION AND BOND FOR SOLID FUEL
MOTORS AND METHOD OF MAKING SAME
Original Filed Oct. 10, 1966

INVENTORS:
CALVIN M. DOLAN,
JOHN S. AXELSON,

BY

ATTORNEY

United States Patent Office 3,578,520
Patented May 11, 1971

3,578,520
THERMAL INSULATION AND BOND FOR SOLID FUEL MOTORS AND METHOD OF MAKING SAME
Calvin M. Dolan, King of Prussia, and John S. Axelson, Levittown, Pa., assignors to General Electric Company
Original application Oct. 10, 1966, Ser. No. 588,003, Divided and this application July 17, 1968, Ser. No. 745,638
Int. Cl. B32b 5/20
U.S. Cl. 156—79
7 Claims

ABSTRACT OF THE DISCLOSURE

Improved means for bonding a rocket propellant grain to its casing and thermally insulating the grain from the casing comprises the interposition between the grain and casing of a room-temperature curing and foaming elastomeric material with char retention additives. The preferred elastomeric materials are silicones and silicone epoxies. Generally, a thin layer of the insulative-adhesive foaming material is first applied either to the outer surface of the preformed rocket grain or to the inner surface of the rocket grain casing. The grain and casing are then assembled and the elastomer is allowed to foam, filling the space between the rocket grain and the casing.

---

This application is a division of Ser. No. 588,003, filed Oct. 10, 1966, now abandoned.

This invention is related to an improved solid rocket motor insulator and bond and in particular to improved techniques for assembling solid fuel rocket motors, i.e., propellant grains, in casings therefor with a simple and effective insulating-bonding system.

Various methods are presently used to bond propellant grains to the housings or casings for such motors and to insulate them thermally from their housings or casings. Since these assembled propellant grains and casings must be able to withstand a wide range of environmental conditions and since very high temperatures and pressures occur internally during engine operation, many difficulties are encountered in the design and fabrication of propellant grain-casing insulating and bonding systems. Generally, separate materials are used to insulate and to bond the grain to the casing. For example, compressible bonds for improved thermal cycling capability have been provided by pressure injecting foamable material into the space between an assembled solid rocket motor and its casing. A separate layer of material around the outer surface of the solid rocket motor is the most common form of thermal insulation used in these applications. In all known systems, however, thermally insulating the propellant grain from the casing and bonding the grain to the casing is accomplished only by complex and often ineffective systems of the type described. With a view to these problems, it is an object of the present invention to provide a simplified thermal insulator and bond in a solid rocket motor propellant-rocket motor case assembly.

Another object of this invention is to provide a simplified method for bonding and insulating a propellant grain.

Still another object of this invention is to provide a simplified and efficient means for assembling a propellant grain housing and a solid propellant grain so that the housing is effectively bonded to and thermally insulated from the rocket grain.

These and other objects are met, in accordance with the present invention, by the interposition of an insulating and adhesive foam between a propellant grain and a casing therefor and, in particular, by an assembly method comprised of applying a foamable insulating adhesive material to one of the mating components of a rocket grain-casing system prior to the assembly thereof with the other mating component, assembling these components, and allowing the resinous material to foam, in situ.

In the preferred foam of the present invention, a room temperature vulcanizing silicone with a char-retention additive and foaming agent is sprayed or doctor-bladed onto the outer surface of a solid rocket motor or the inner surface of a rocket motor housing or casing. The motor and casing are then assembled and the resin allowed to foam.

While the specification concludes with claims particularly pointing out and distinctly claiming the subject matter of the present invention, this invention may be better understood from the following description taken in conjunction with the accompanying drawings, in which:

Figure 1:
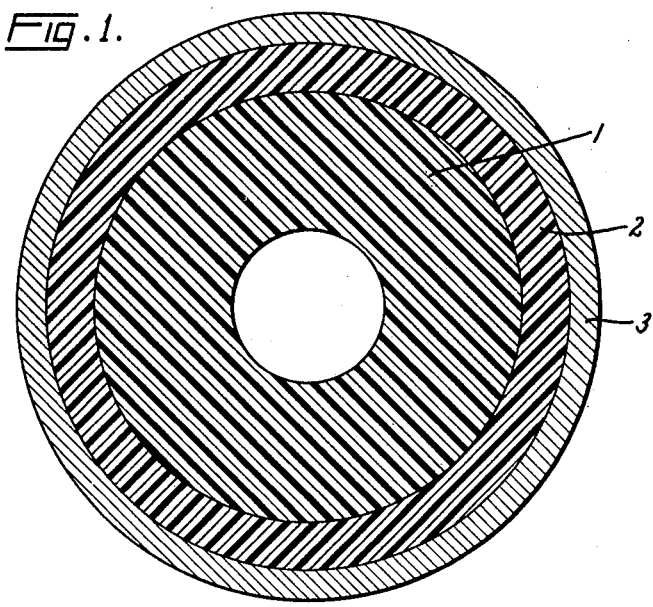
FIG. 1 is a cross sectional view of a rocket grain-casing assembly made in accordance with the present invention.
Figure 2:
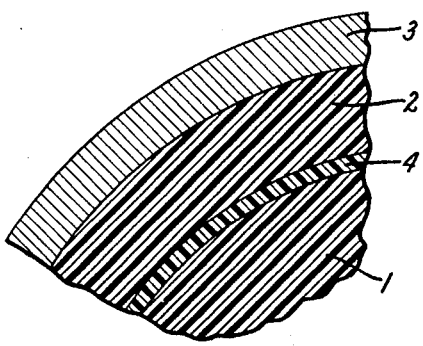
FIG. 2 is an enlarged view of a part of the section shown in FIG. 1.

Referring more specifically to FIGS. 1 and 2, there is shown a rocket propellant grain 1, an elastomeric insulative-adhesive layer 2, a rocket grain casing 3 and a propellant sealer layer 4 which facilitates the adhesion of layer 2 to propellant grain 1.

Figure 3:
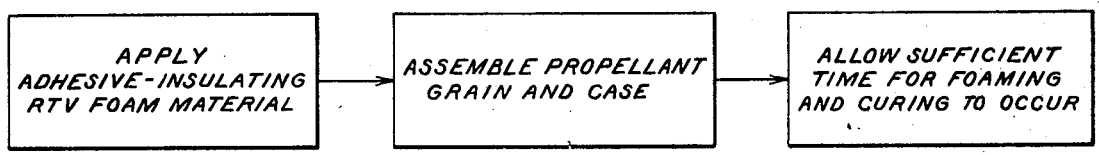
FIG. 3 is a flow diagram of the process of the present invention.

In FIG. 3, there is shown, schematically, a flow diagram depicting the three steps in assembling a propellant grain and a casing therefor in accordance with the present invention. These steps comprise, respectively, (1) applying an adhesive-insulative foam precursor material either to the inside of the grain casing or to the outside surface of the propellant grain, (2) inserting the grain into the casing, and (3) causing foam formation and curing to occur in the space between the grain and the casing. In the case of room temperature foaming and curing material, the third step simply requires allowing sufficient time for foaming and curing to occur.

The present invention involves, first, the selection of a suitable insulating and bonding material. In addition to weight and availability, the bondability of the material to the rocket casing and to the rocket grain must be considered. Further, to utilize the preferred application techniques of the present invention, the material should be suitable for in situ foaming and should also be elastomeric to enhance the thermal cycling capability of the system. For these reasons, room temperature-curing and foaming elastomeric silicones and silicone-epoxies are preferred. The advantages of these materials include the ability to withstand wide very low temperature fluctuations and, in particular, the ability to withstand very low temperature exposure. Char-retention promoters are generally incorporated into this material to enhance the ablative-erosion heat dissipation in the insulating-bonding material. Materials of this type have been used heretofore for the outer shielding of aerospace vehicles. In the present invention, however, it has been found that such materials are peculiarly adapted to provide both the bond and the insulation needed between a solid rocket propellant grain and its casing.

With regard particularly to the char retention promoter incorporated in the resin material, one such additive which has been used is aluminum silicate fibers.

The preferred method of utilizing the present invention with solid rocket motor propellant grains, as described above, is first to apply a layer of the insulating and bonding elastomeric material either to the outer surface of the pre-formed grain or the inner surface of the rocket casing after proper surface preparation and/or priming of these surfaces. This application may be made by spraying the elastomeric material or by spreading it on with a doctor-blade. The pre-formed grain and the case are then assembled and the elastomer allowed to foam in place, thereby bonding the grain to the casing and providing the necessary insulation therebetween. If a room temperature vulcanizing silicone material is used as the insulator and bond, the grain and the casing should be assembled fairly quickly after the material has been applied. The foaming and curing of the elastomer then occurs in due course and the assembly is complete. If heat is required to foam and/or cure the material, the assembled components can be heated any time after they have been assembled. Thus, the foaming and curing of the material can be scheduled to occur at any desired point in the manufacturing process following assembly of the grain and casing.

In the adaption of the present invention to cast-in-place solid rocket systems, the insulating and bonding material is applied to the inner surface of the casing. For example sheets of pre-formed foamed material of the type used in the present invention may be bonded to the inner surface of the casing. The propellant is then cast into the insulated casing in a conventional manner. This provides an effective insulating system for the casing which is substantially lighter than those presently available. As pointed out above, the elements to be bonded may require pre-treatment or priming in order to enhance the adhesiveness of the elastomeric insulating-adhesive material to these elements. In one example, a polybutadiene-based rocket grain was sealed and primed prior to the application of a RTV foamed silicone in order to insure adequate bonding between these materials. Similarly, in some cases it is necessary to apply a thin layer of the binder resin of the propellant to be bonded over a foamed silicone or silicone-epoxy insulating layer prior to assembling or casting the propellant in the insulated casing.

In forming the simplified bond and insulator of the present invention, spray application techniques are found to be most effective to provide the uniform layer which is subsequently foamed and cured in situ. A particularly effective technique for spraying RTV silicone foam formulations has been developed for use in conjunction with the present invention. This technique utilizes a volatile material, such as Freon, which is incorporated in the insulator-bond material formulation. The volatile material enables the otherwise viscous formulation to be sprayed and, since the volatile material volatilizes just before the sprayed material touches the surface to be coated, it does not interfere with or contaminate the coating. In using this technique, the thickness of the coating is controlled by the number of passes which the spraying apparatus makes over the surface being coated.

The present invention then provides a simple and effective technique for bonding and insulating solid rocket propellant grains and cases therefor. In addition, the bond and insulating material used in the present invention is lightweight, thermally stable, and readily available. Further, this invention facilitates the assembly of solid rocket grains and rocket casings by simplifying the techniques and apparatus used for this assembly and by permitting the use of less rigid dimensional tolerances in the elements to be assembled.

Finally, the elastomeric nature of the insulating-bonding material used in the present invention compensates for dimensional variations caused by temperature changes or rapid pressure build-up during rocket ignition. This enhances the thermocycling capability of the assembly and lessens the probability of catastrophic failure due to ignition over-pressure.

While the present invention has been described with reference to particular embodiments thereof, for purposes of clarity and convenience, it should be understood that numerous modifications may be made by those skilled in the art without departing from the invention's true spirit and scope. Therefore the appended claims are intended to cover all such equivalent variations as come within the true spirit and scope of the present invention.

What we claim as new, and desire to secure by Letters Patent of the United States is:

1. A method of making a thermally insulating bond between the outer surface of a solid rocket propellant grain and the inner surface of a housing for said grain, said method comprising applying a room temperature foamable resinous insulating and adhesive material to one of said surfaces, assembling said grain in said housing and allowing time for foaming of said material to take place.

2. A method, as recited in claim 1, wherein said foamable insulating and adhesive material comprises a room temperature vulcanizing silicone having a char-retention promoter.

3. A method, as recited in claim 1, wherein said foamable insulating and adhesive material comprises a room temperature vulcanizing epoxy-silicone having a char-retention promoter.

4. A method, as recited in claim 1, wherein said foamable material is applied by spreading it with a doctor-blade.

5. A method, as recited in claim 1, wherein said foamable material is applied by spraying a mixture of said material with a spray-facilitating additive onto one of said surfaces.

6. A method, as recited in claim 1, wherein said foamable material is applied by spraying a mixture of said material with Freon onto one of said surfaces.

7. A method, as recited in claim 1, wherein said foamable material comprises a room temperature vulcanizing epoxy-silicone having a char-retention promotor, and is applied by spraying a mixture of said material with a spray-facilitating additive onto one of said surfaces.

References Cited

UNITED STATES PATENTS

| | | | |
|---|---|---|---|
| 3,054,253 | 9/1962 | Chung | 102—103X |
| 3,104,523 | 9/1963 | O'Donnell | 60—35.6 |
| 3,142,864 | 8/1964 | Pelley | 264—47 |
| 3,324,795 | 6/1967 | Miles et al. | 102—103X |

CARL D. QUARFORTH, Primary Examiner

S. HELLMAN, Assistant Examiner

U.S. Cl. X.R.

60—35.6; 102—103; 264—47